US012613507B2

(12) United States Patent (10) Patent No.: US 12,613,507 B2
Connor et al. (45) Date of Patent: Apr. 28, 2026

(54) INDUSTRIAL AUTOMATION REMANUFACTURING AND REPAIR SUSTAINABILITY REPORTING/DASHBOARD

(71) Applicant: ROCKWELL AUTOMATION TECHNOLOGIES, INC., Mayfield Heights, OH (US)

(72) Inventors: Joshua W. Connor, Sussex, WI (US); Alexandra L. Schwertner, Cleveland, OH (US); Jason R. Mannion, Havertown, PA (US); Spring S. Guilford, Los Angeles, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 360 days.

(21) Appl. No.: 18/320,831

(22) Filed: May 19, 2023

(65) Prior Publication Data

US 2024/0134339 A1    Apr. 25, 2024
US 2024/0231306 A9    Jul. 11, 2024

Related U.S. Application Data

(60) Provisional application No. 63/418,811, filed on Oct. 24, 2022.

(51) Int. Cl.
*G05B 19/406*        (2006.01)

(52) U.S. Cl.
CPC .. *G05B 19/406* (2013.01); *G05B 2219/31316* (2013.01)

(58) Field of Classification Search
CPC ........ G05B 19/406; G05B 2219/31316; G06Q 10/20; G06Q 10/00
See application file for complete search history.

(56) References Cited

U.S. PATENT DOCUMENTS

| | | | | | |
|---|---|---|---|---|---|
| 5,566,092 A | * | 10/1996 | Wang | ................ | G05B 19/4184 |
| | | | | | 706/912 |
| 2010/0152910 A1 | * | 6/2010 | Taft | ........................ | H02H 3/042 |
| | | | | | 700/286 |
| 2010/0274629 A1 | * | 10/2010 | Walker | ................ | G06Q 10/087 |
| | | | | | 705/308 |
| 2014/0337086 A1 | * | 11/2014 | Asenjo | ................ | G06F 3/0635 |
| | | | | | 705/7.28 |

(Continued)

OTHER PUBLICATIONS

Sourceforge, Microsoft Cloud for Sustainability Alternatives, Retrieved from https://sourceforge.net/software/product/Microsoft-Cloud-for-Sustainability/alternatives, Version Accessed on Jun. 24, 2024, 9 pages.

(Continued)

*Primary Examiner* — Kidest Worku
(74) *Attorney, Agent, or Firm* — Quarles & Brady LLP

(57) ABSTRACT

Systems and methods for providing industrial automation sustainability reporting. One method includes receiving sustainability data for an industrial device included in an industrial system. The method also includes determining, based on the sustainability data, a predicted sustainability score for each of a plurality of remediation actions as a set of predicted sustainability scores. The method also includes generating and transmitting a graphical representation of the set of predicted sustainability scores for display.

19 Claims, 22 Drawing Sheets

(56) References Cited

U.S. PATENT DOCUMENTS

2016/0282854 A1* 9/2016 Jauquet ................ G05B 19/042
2018/0365630 A1 12/2018 Seals et al.
2019/0391573 A1* 12/2019 Wang ................. G05B 23/0254
2020/0096965 A1* 3/2020 Mazur ..................... G06F 16/26

OTHER PUBLICATIONS

European Patent Office, Extended European Search Report, Application No. 23203749.9, Mar. 20, 2024, 7 pages.

* cited by examiner

300

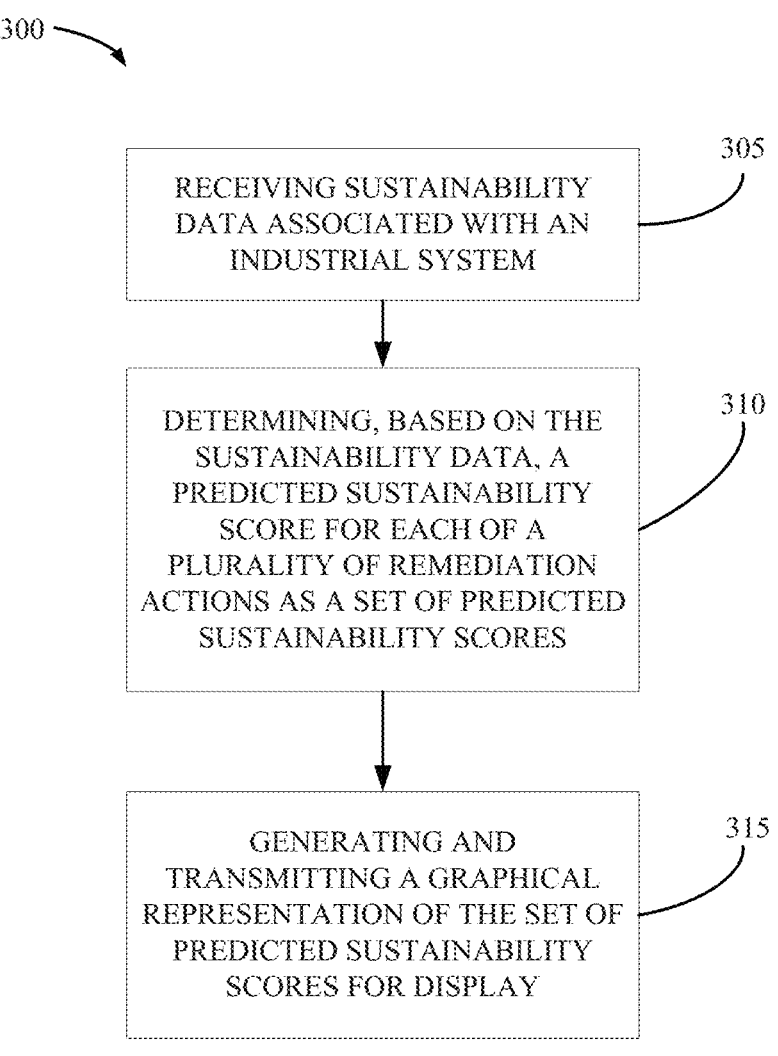

305

RECEIVING SUSTAINABILITY
DATA ASSOCIATED WITH AN
INDUSTRIAL SYSTEM

310

DETERMINING, BASED ON THE
SUSTAINABILITY DATA, A
PREDICTED SUSTAINABILITY
SCORE FOR EACH OF A
PLURALITY OF REMEDIATION
ACTIONS AS A SET OF PREDICTED
SUSTAINABILITY SCORES

315

GENERATING AND
TRANSMITTING A GRAPHICAL
REPRESENTATION OF THE SET OF
PREDICTED SUSTAINABILITY
SCORES FOR DISPLAY

FIG. 3

Technician/engineer repairs on site

Emissions $$GHG_i = \frac{P_i * t * EF_g}{AF_i}$$

Emissions

 CO2

Energy consumption $$e_i = \frac{P_i * t}{AF_i}$$

Energy Consumption

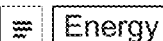 Energy

Water $$w_i = \frac{q * t}{AF}$$

Water consumption

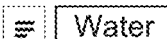 Water

Waste $$Rw_i = \frac{\sum(P * wp)}{AF}$$

Waste generation

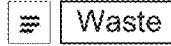 Waste

Emissions due to waste transportation

Allocated to products' waste parts $$GHG_i = \sum \left(\frac{D_i * EF_f * Rw_i}{WF_i}\right)$$

Unallocated $$GHG_i = \sum \left(\frac{D_i * EF_f * (WF_i - Rw_i - AF_i)}{WF_i}\right)$$

Waste generation

 CO2

FIG. 7

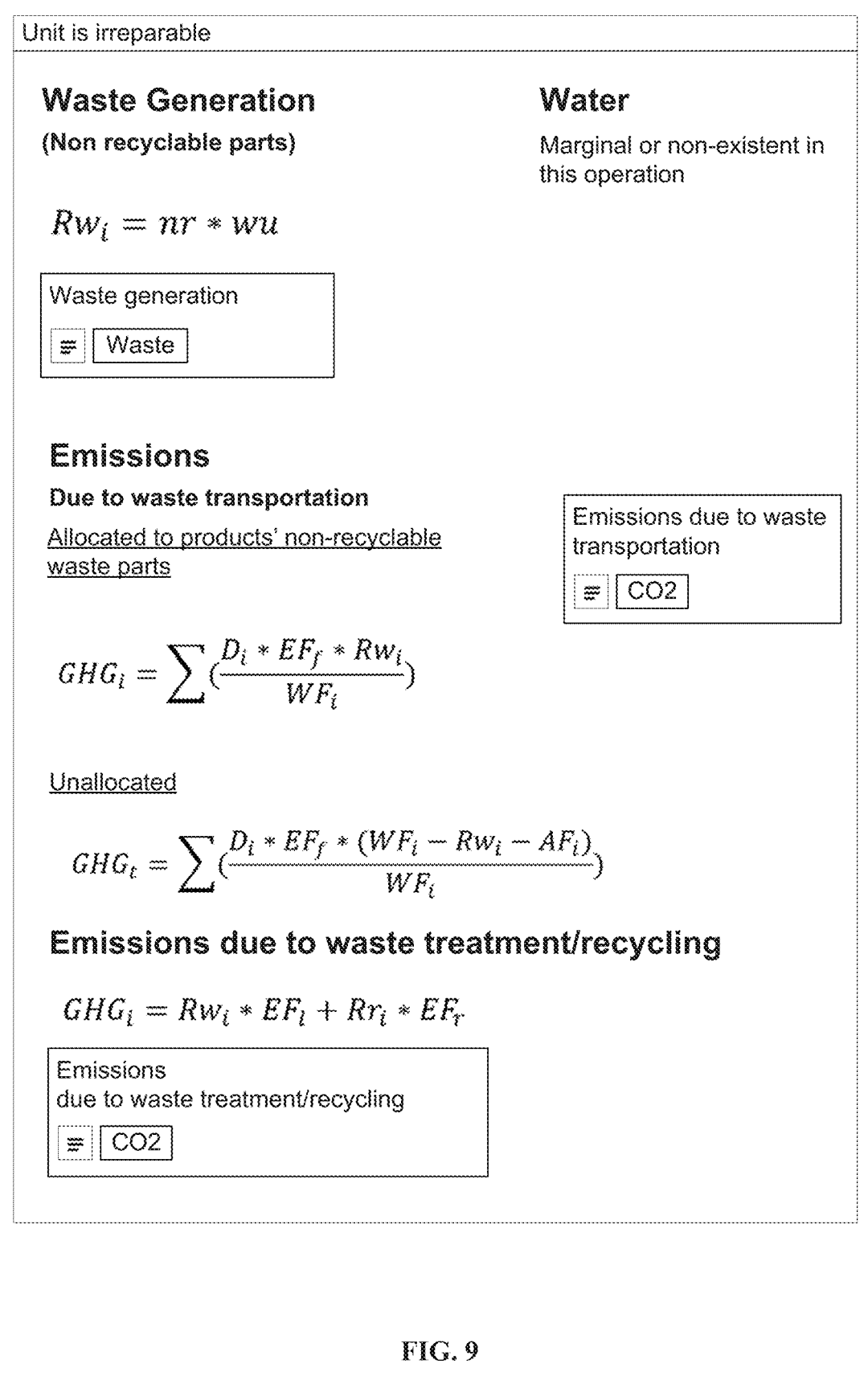

Unit is irreparable

Waste Generation
(Non recyclable parts)

Water

Marginal or non-existent in this operation $$Rw_i = nr * wu$$

Waste generation

| ≡ | Waste |

Emissions

Due to waste transportation

<u>Allocated to products' non-recyclable waste parts</u>

Emissions due to waste transportation

| ≡ | CO2 |

$$GHG_i = \sum \left( \frac{D_i * EF_f * Rw_i}{WF_i} \right)$$

<u>Unallocated</u>

$$GHG_t = \sum \left( \frac{D_i * EF_f * (WF_i - Rw_i - AF_i)}{WF_i} \right)$$

Emissions due to waste treatment/recycling $$GHG_i = Rw_i * EF_i + Rr_i * EF_r$$

Emissions
due to waste treatment/recycling

| ≡ | CO2 |

FIG. 9

Client receives unit through Priority Exchange

Emissions due to new unit transportation

Allocated to RA products $$GHG_i = \sum \left( \frac{D_i * EF_f * N_i}{WF_i} \right)$$

Unallocated $$GHG_t = \sum \left( \frac{D_i * EF_f * (WF_i - N_i)}{WF_i} \right)$$

Emissions
due to new unit
transportation

≡ | $CO_2$

Waste generation (packaging)

$$Pw = p\% * wu$$

Waste generation
(packaging)

≡ | Waste

Emissions due to waste treatment/recycling $$GHG_i = Rw_i * EF_l + Rr_i * EF_r$$

Emissions Due to
waste treatment/
recycling

≡ | $CO_2$

Emissions due to waste transportation

Allocated to products' non-recyclable
waste parts $$GHG_i = \sum \left( \frac{D_i * EF_f * Pw_i}{WF_i} \right)$$

Emissions due to
waste transportation

≡ | $CO_2$

Unallocated $$GHG_t = \sum \left( \frac{D_i * EF_f * (WF_i - Pw_i * AF_i)}{WF_i} \right)$$

FIG. 10

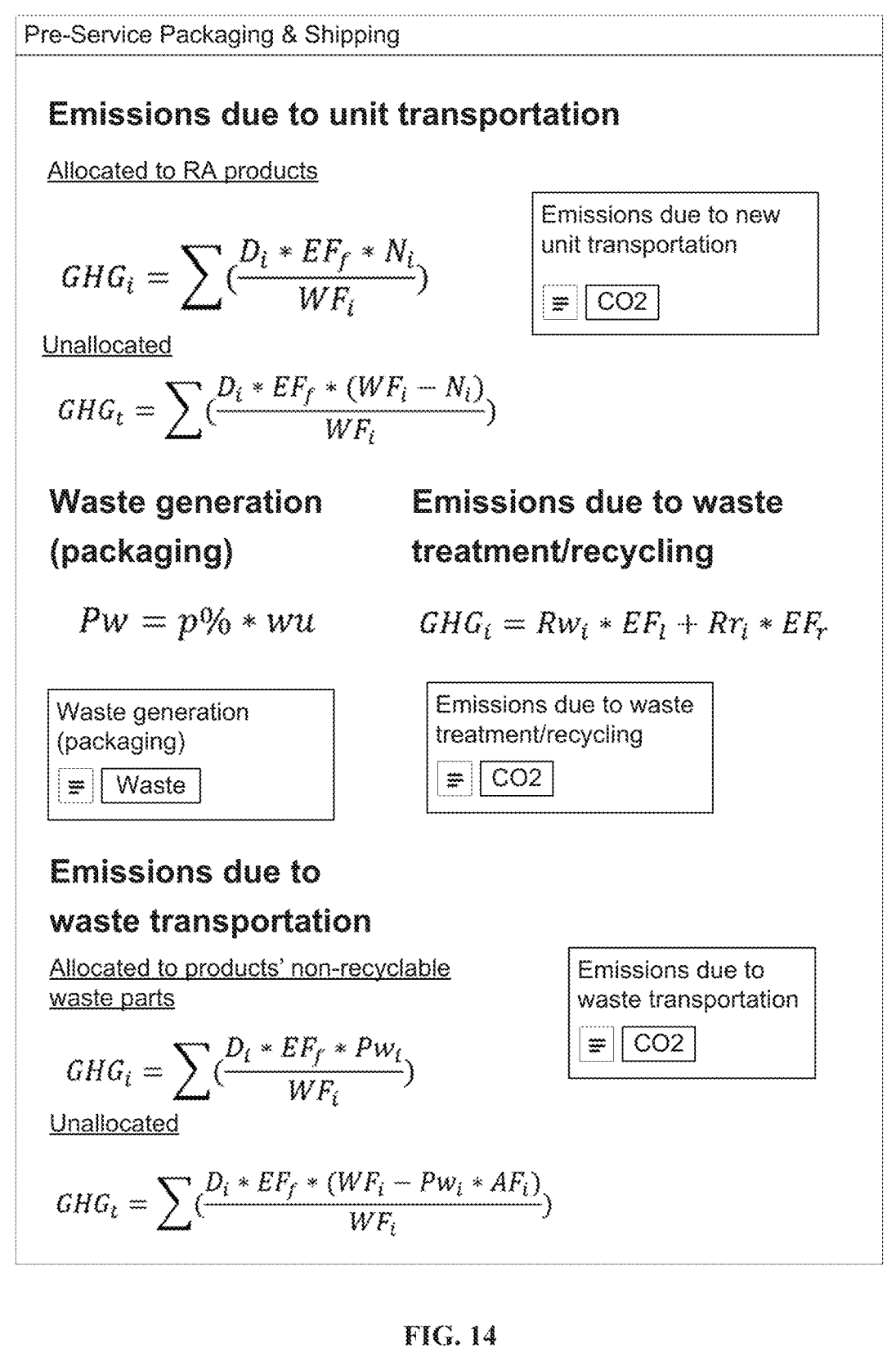

Pre-Service Packaging & Shipping

Emissions due to unit transportation

Allocated to RA products $$GHG_i = \sum \left( \frac{D_i * EF_f * N_i}{WF_i} \right)$$

<div>
Emissions due to new unit transportation

≡  CO2
</div>

Unallocated $$GHG_t = \sum \left( \frac{D_i * EF_f * (WF_i - N_i)}{WF_i} \right)$$

Waste generation (packaging)

$$Pw = p\% * wu$$

<div>
Waste generation (packaging)

≡  Waste
</div>

Emissions due to waste treatment/recycling $$GHG_i = Rw_i * EF_l + Rr_i * EF_r$$

<div>
Emissions due to waste treatment/recycling

≡  CO2
</div>

Emissions due to waste transportation

Allocated to products' non-recyclable waste parts $$GHG_i = \sum \left( \frac{D_i * EF_f * Pw_i}{WF_i} \right)$$

<div>
Emissions due to waste transportation

≡  CO2
</div>

Unallocated $$GHG_t = \sum \left( \frac{D_i * EF_f * (WF_i - Pw_i * AF_i)}{WF_i} \right)$$

FIG. 14

Repair

Emissions $$GHG_i = \frac{P_i * t * EF_g}{AF_i}$$

Emissions

 CO2

Energy consumption $$e_i = \frac{P_i * t}{AF_i}$$

Energy Consumption

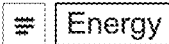 Energy

Water consumption $$w_i = \frac{q * t}{AF}$$

Water consumption

☰ Water

Waste generation $$Rw_i = \frac{\sum(P * wp)}{AF}$$

Waste generation

☰ Waste

Emissions due to waste transportation
Allocated to products' non-recyclable waste parts $$GHG_i = \sum(\frac{D_i * EF_f * Rw_i}{WF_i})$$

Unallocated $$GHG_t = \sum(\frac{D_i * EF_f * (WF_i - Rw_i - AF_i)}{WF_i})$$

Emissions
Due to waste
transportation

 CO2

Emissions due to waste treatment/recycling $$GHG_i = Rw_i * EF_i + Rr_i * EF_r$$

Emissions
due to waste treatment/recycling

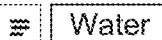 CO2

FIG. 15

After-repair test

Emissions $$GHG_i = \frac{P_i * t * EF_g}{AF_t}$$

Emissions

≡ CO2

Energy consumption $$e_i = \frac{P_i * t}{AF_i}$$

Energy Consumption

≡ Energy

Water

Marginal or non-existent in this operation

Waste

Marginal or non-existent in this operation

FIG. 16

Remanufacture

Emissions $$GHG_i = \frac{P_i * t * EF_g}{AF_i}$$

Emissions

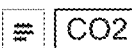 CO2

Energy consumption $$e_i = \frac{P_i * t}{AF_i}$$

Energy Consumption

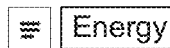 Energy

Water $$w_i = \frac{q * t}{AF}$$

Water consumption

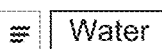 Water

Waste $$Rw_i = \frac{\sum(P * wp)}{AF}$$

Waste generation

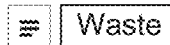 Waste

Emissions due to waste transportation

Allocated to products' non-recyclable waste parts $$GHG_i = \sum(\frac{D_i * EF_f * Pw_i}{WF_i})$$

Unallocated $$GHG_i = \sum(\frac{D_i * EF_f * (WF_i - Pw_i * AF_i)}{WF_i})$$

Emissions
due to waste
transportation

 CO2

Emissions due to waste treatment/recycling $$GHG_i = Rw_i * EF_l + Rr_i * EF_r$$

Emissions
due to waste treatment/recycling

After-Remanufacture tests
Emissions
$$GHG_i = \frac{P_i * t * EF_g}{AF_i}$$
Emissions
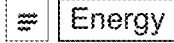 CO2
Energy consumption
$$e_i = \frac{P_i * t}{AF_i}$$
Energy Consumption
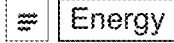 Energy
Water
Marginal or non-existent in this operation
Waste
Marginal or non-existent in this operation
FIG. 18

Post-Service Packaging and Shipping

Emissions due to new unit transportation

Allocated to RA products $$GHG_i = \sum \left( \frac{D_i * EF_f * N_i}{WF_i} \right)$$

Emissions due to new unit transportation $\equiv$ CO2

Unallocated $$GHG_t = \sum \left( \frac{D_i * EF_f * (WF_i - N_i)}{WF_i} \right)$$

Waste generation (packaging)

$$Pw = p\% * wu$$

Waste generation (packaging)

$\equiv$ Waste

Emissions due to waste treatment/recycling $$GHG_i = Rw_i * EF_i + Rr_i * EF_r$$

Emissions due to waste treatment/recycling $\equiv$ CO2

Emissions due to waste transportation

Allocated to products' non-recyclable waste parts $$GHG_i = \sum \left( \frac{D_i * EF_f * Pw_i}{WF_i} \right)$$

Emissions due to waste transportation $\equiv$ CO2

Unallocated $$GHG_t = \sum \left( \frac{D_i * EF_f * (WF_i - Pw_i * AF_i)}{WF_i} \right)$$

FIG. 19

INDUSTRIAL AUTOMATION REMANUFACTURING AND REPAIR SUSTAINABILITY REPORTING/DASHBOARD

CROSS-REFERENCE TO RELATED APPLICATIONS

This application claims priority to U.S. Provisional Application No. 63/418,811, filed on Oct. 24, 2022, the entire contents of which is incorporated herein by reference.

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to industrial automation remanufacturing and repair sustainability reporting.

In recent years, there has been increasing pressure from investors, customers, clients, and employees for companies to be "more sustainable." Subsequently, companies are working to get up to speed with this demand and are trying to figure out what sustainability means to them, how they can best respond to such pressure, and how they can approach such challenges in the marketplace. Companies are making commitments to measure, track, and reduce environmental impact areas such as energy, water, waste, carbon emissions, and the like. Companies are also starting to map their operations against the United Nations 19 Sustainable Development Goals (SDGs), other third-party standards organizations, such as the Sustainability Accounting Standards Board (SASB) and the Global Reporting Initiative (GRI), and country or regional-specific environmental regulation. Such commitments are being shared very publicly. In order to meet those promises, companies need to be able to track, analyze, and make investments towards achieving their sustainability objectives. Companies are looking for metrics that help them set baselines into their operations, insights that help them know when and where to take action, tools to monitor and measure progress, and reporting capabilities that can be disclosed in annual reports.

Emissions are generally classified into multiple scopes, including Scope 1 emissions, Scope 2 emissions, and Scope 3 emissions. Scope 1 emissions generally include direct emissions from owned or controlled sources. Scope 2 emissions generally include indirect emissions from the generation of purchased energy (e.g., electricity, steam, heating, cooling, etc.). Scope 3 emissions generally include indirect emissions (not included in Scope 2) that occur in the value chain of a reporting entity or company, including both upstream and downstream emissions (also referred to as a company's value chain or a corporate value chain). Additionally, in some instances, emissions may be classified into an additional or different scope of emissions. As one such example, Scope 4 emissions may include avoided emissions (e.g., reductions that occur outside of a product's life cycle or value chain, but as a result of the use of that product). Product life cycle emissions generally include the emissions associated with the production and use of a specific product, including emissions from raw materials, manufacture, transport, storage, sale, use, and disposal.

Accordingly, the technology disclosed herein relates to a sustainability tool or dashboard for visualizing an environmental impact of remanufacturing and repair, field labor, remote support, etc. The sustainability dashboard may enable improved and enhanced tracking and measurement of sustainability metrics, such that, e.g., an end user or customer may have an improved user experience and, ultimately, enable informed decision making with respect to achieving the end user's sustainability objectives (e.g., including informing decisions on facility operations for repair, modernization, risk assessments, etc.). The technology disclosed herein can help to reduce carbon emissions, eliminate waste, and increase the remanufacture and repair industry (as opposed to acquiring new machinery) while enabling a circular economy. Accordingly, some configurations provide a front-end, end-user user experience ("UX") software tool and a back-end "sustainability engine," which is a data integration platform that can include core business logic, formulated insights, and the like for delivery to front-end systems (e.g., user-facing applications, UX, etc.).

In some configurations, the technology disclosed herein provides a back-end sustainability engine that powers the front-end UX. The back-end sustainability engine may provide a centralized location or single source of truth for the data powering the front-end UX. In some configurations, the sustainability engine may be a separate platform developed to store logic and formulated information (e.g., insights) for consumption or delivery to a variety of downstream systems, application, UXs, and the like.

Accordingly, the configurations described herein provide for systems and methods for providing industrial automation sustainability reporting. One configuration provides a system for providing industrial automation sustainability reporting. The system includes an electronic processor configured to receive sustainability data for an industrial device included in an industrial system, wherein the industrial device is associated with a fault condition. The electronic processor is also configured to determine, based on the sustainability data, a predicted sustainability score for each of a plurality of remediation actions as a set of predicted sustainability scores. The electronic processor is also configured to generate and transmit a graphical representation of the set of predicted sustainability scores for display.

Another configuration provides a method for providing industrial automation sustainability reporting. The method includes receiving, with an electronic processor, sustainability data for an industrial device included in an industrial system, wherein the industrial device is associated with a fault condition. The method also includes determining, with the electronic processor, based on the sustainability data, a predicted sustainability score for each of a plurality of remediation actions as a set of predicted sustainability scores. The method also includes generating and transmitting, with the electronic processor, a graphical representation of the set of predicted sustainability scores for display.

Yet another configuration includes a non-transitory computer-readable medium storing instructions that, when executed by an electronic processor, perform a set of functions. The set of functions includes receiving sustainability data for an industrial device included in an industrial system, wherein the industrial device is associated with a fault condition. The set of functions also includes determining based on the sustainability data, a predicted sustainability score for each of a plurality of remediation actions as a set of predicted sustainability scores. The set of functions also includes generating and transmitting a graphical representation of the set of predicted sustainability scores for display.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

FIG. 3 is a flowchart illustrating a method for providing industrial automation sustainability reporting according to some configurations.

FIG. 7 illustrates calculations associated with a technician/engineer repairing an industrial device on site according to some configurations.

FIG. 9 illustrates calculations associated with an industrial device that is not repairable on site and the unit is irreparable according to some configurations.

FIG. 10 illustrates calculations associated with an industrial device that is not repairable on site and there is access to priority exchange according to some configurations.

FIG. 14 illustrates calculations associated with pre-service packaging and shipping according to some configurations.

FIG. 15 illustrates calculations associated with repair according to some configurations.

FIG. 16 illustrates calculations associated with repair testing according to some configurations.

FIG. 17 illustrates calculations associated with remanufacture according to some configurations.

FIG. 18 illustrates calculations associated with remanufacture tests according to some configurations.

FIG. 19 illustrates calculations associated with post-service packaging and shipping according to some configurations.

DETAILED DESCRIPTION

Figure 1:
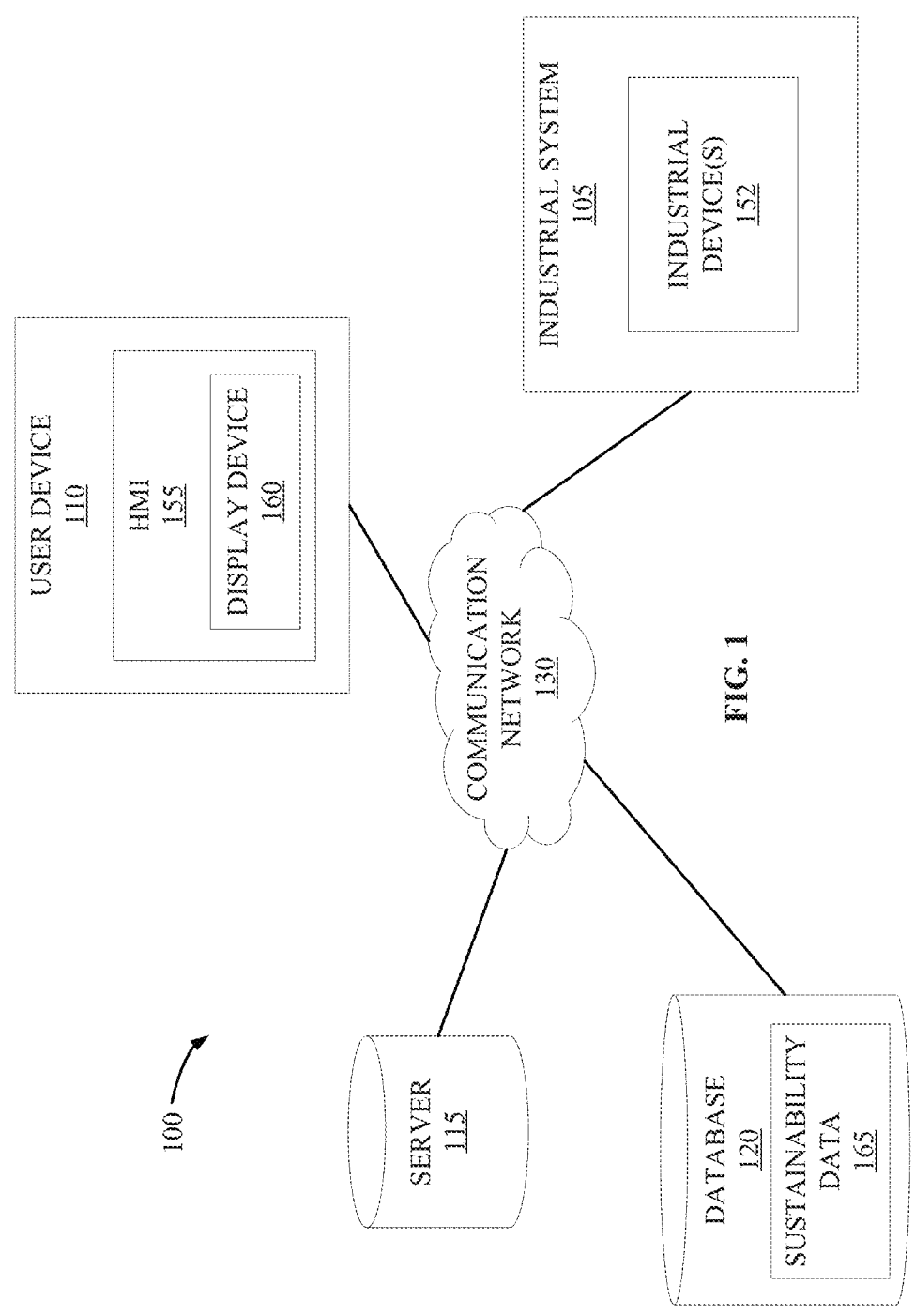
FIG. 1 schematically illustrates a system for providing industrial automation sustainability reporting according to some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for providing industrial automation sustainability reporting for an industrial system according to some configurations. In the illustrated example, the system 100 may include an industrial system 105, a user device 110, a server 115, and a database 120. In some embodiments, the system 100 includes fewer, additional, or different components in different configurations than illustrated in FIG. 1. As one non-limiting example, the system 100 may include multiple industrial systems 105, multiple user devices 110, multiple servers 115, multiple databases 120, or a combination thereof. As another non-limiting example, one or more components of the system 100 may be combined into a single device, such as, e.g., the user device 110 and the server 115, the server 115 and the database 120, etc. Alternatively, or in addition, in some embodiments, the user device 110, the server 115, the database 120, or a combination thereof may be included as part of the industrial system 105 (e.g., as a component of the industrial system 105).

The industrial system 105, the user device 110, the server 115, the database 120 may communicate over one or more wired or wireless communication networks 130. Portions of the communication networks 130 may be implemented using a wide area network, such as the Internet, a local area network, such as BLUETOOTH® or WI-FIC), and combinations or derivatives thereof. Alternatively, or in addition, in some embodiments, components of the system 100 may communicate directly as compared to through the communication network 130. Also, in some embodiments, the components of the system 100 may communicate through one or more intermediary devices not illustrated in FIG. 1.

The industrial system 105 may be a manufacturing system, such as, e.g., an industrial automation system or the like. The industrial system 105 may be associated with (or located at) a facility or site. In some configurations, a facility or site may be associated with multiple industrial systems 105 (e.g., a first industrial system, a second industrial system, a third industrial system, etc.). Accordingly, in some configurations, the industrial system 105 may be implemented at a facility. The industrial system 105 may be configured to perform one or more industrial processes, manufacturing processes, production processes, or the like. In some embodiments, the industrial system 105 may perform a production method that produces goods or products. As one non-limiting example, the industrial system 105 may perform a vehicle manufacturing processor to assemble or produce a vehicle (or various components thereof). As another non-limiting example, the industrial system 105 may perform a food manufacturing process for making a food product.

In the illustrated example, the industrial system 105 may include one or more industrial devices 152 (referred to herein collectively as "the industrial devices 152" and individually as "the industrial device 152"). The industrial device 152 may be a physical piece of equipment included in the industrial system 105. For example, an industrial device 152 may include a pump, a press, a conveyor, a valve, an industrial controller (e.g., a programmable logic controller ("PLC") and the like), a switch, a sensor, a server, a database, a human-machine interface ("HMI"), another piece of equipment that may be used in connection with an associated industrial process or application of the industrial system 105, or the like.

Figure 2:
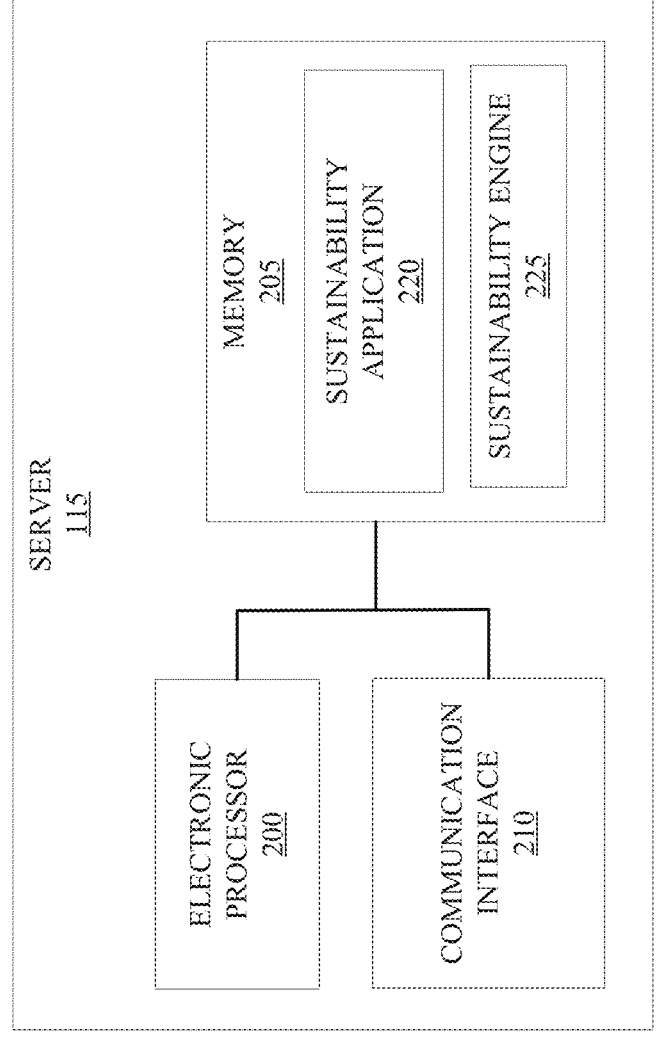
FIG. 2 schematically illustrates a server included in the system of FIG. 1 according to some configurations.

The server 115 may be a computing device. As illustrated in FIG. 2, the server 115 may include an electronic processor 200, a memory 205, and a communication interface 210. The electronic processor 200, the memory 205, and the communication interface 210 may communicate wirelessly, over one or more communication lines or buses, or a combination thereof. The server 115 may include additional components than those illustrated in FIG. 2 in various configurations. The server 115 may also perform additional functionality other than the functionality described herein. Also, the functionality (or a portion thereof) described herein as being performed by the server 115 may be distributed among multiple devices (e.g., as part of a cloud service or cloud-computing environment), combined with another component of the system 100 (e.g., combined with the user device 110, the database 120, another component of the system 100, or the like), or a combination thereof. As one non-limiting example, the server 115 may be a cloud server (e.g., part of a cloud computing environment or network).

The communication interface 210 may include a transceiver that communicates with the industrial system 105, the user device 110, the database 120, or a combination thereof over the communication network 130 and, optionally, one or more other communication networks or connections. In some configurations, the communication interface 210 enables the server 115 to communicate with the industrial system 105, the user device 110, the database 120, or a combination thereof over one or more wired or wireless connections. The electronic processor 200 may include a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

As one non-limiting example, as illustrated in FIG. 2, the memory 205 may include a sustainability application 220 (referred to herein as "the application 220"). The application 220 may be a software application executable by the electronic processor 200 in the example illustrated and as specifically discussed below, although a similarly purposed module may be implemented in other ways in other examples. The electronic processor 200 may execute the application 220 to provide industrial automation sustainability reporting for the industrial system 105 (or one or more industrial devices 152 therein). In some configurations, the application 220 may access a sustainability engine 225 to provide industrial automation sustainability reporting (or information), such as, e.g., by generating a front-end, end-user user interface or dashboard. As illustrated in FIG. 2, the sustainability engine 225 may also be stored in the memory 205. However, in some configurations, the sustainability engine 225 may be stored remotely (e.g., in the user device 110). The sustainability engine 225 may function as a data integration function or component that powers the front-end, end-user user interface or dashboard provided by the application 220. For instance, the sustainability engine 225 may function as a centralized location or single source of truth for the data used to power the front-end, end-user user interface or dashboard. In some configurations, the sustainability engine 225 may function as a data integrator that aggregates data to power sustainability insights and user experience (e.g., through a front-end, user interface or dashboard).

In some configurations the sustainability engine 225 may access historical calculations, data integrations, or a combination thereof. In some examples, the sustainability engine 225 may access the historical calculations, data integrations, or a combination thereof for continued refinement and enhanced accuracy of results (e.g., used to power the sustainability insights and user experience through the front-end interface or dashboard or other consuming applications). Alternatively, or in addition, in some configurations, the sustainability engine 225 may function as a data integrator of other calculated or derived data from other sources, such as, e.g., for the purpose of applying the integrated data to customer sustainable outcomes. As one example, some configurations may implement artificial intelligence (AI) to derive life expectancy of a product, determine a desired or optimal sustainable outcome between repairing an existing product and purchasing a new product. The implementation of such intelligent derived data may be integrated into the sustainability engine 225 and integrated with other factors to be delivered to a user interface or other applications, as described herein.

Returning to FIG. 1, the user device 110 may be a computing device, such as a desktop computer, a laptop computer, a tablet computer, a terminal, a smart telephone, a smart television, a smart wearable, or another suitable computing device that interfaces with a user. Although not illustrated in FIG. 1, the user device 110 may include similar components as the server 115, such as electronic processor (for example, a microprocessor, an ASIC, or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces ("HMIs"). For example, to communicate with the server 115, the user device 110 may store a browser application or a dedicated software application executable by an electronic processor. The system 100 is described herein as providing a sustainability service through the server 115. However, in other embodiments, the functionality described herein as being performed by the server 115 may be locally performed by the user device 110. For example, in some embodiments, the user device 110 may store the application 220, the sustainability engine 225, or a combination thereof.

In some configurations, as illustrated in FIG. 1, the user device 110 may include a HMI 155 for interacting with a user. The HMI 155 may include one or more input devices, one or more output devices, or a combination thereof. Accordingly, in some configurations, the HMI 155 allows a user to interact with (e.g., provide input to and receive output from) the user device 110. For example, the HMI 155 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof. As illustrated in FIG. 1, in some embodiments, the HMI 155 includes a display device 160. The display device 160 may be included in the same housing as the user device 110 or may communicate with the user device 110 over one or more wired or wireless connections. For example, in some configurations, the display device 160 is a touchscreen included in a laptop computer or a tablet computer. In other configurations, the display device 160 is a monitor, a television, or a projector coupled to a terminal, desktop computer, or the like via one or more cables.

As illustrated in FIG. 1, in some configurations, the system 100 includes the database 120. The database 120 may store sustainability data 165. In some configurations, the sustainability data 165 is associated with the industrial system 105 (or a component thereof). Alternatively, or in addition, in some configurations, the sustainability data is associated with multiple industrial systems (e.g., industrial systems implemented at the same facility, different facilities, or a combination thereof). Accordingly, in some configurations, the sustainability data 165 may be aggregated data from multiple industrial systems 105, multiple facilities, or the like.

The sustainability data 165 may identify (or otherwise include) a set of industrial devices included in the industrial system 105 (e.g., the industrial device(s) 152). Alternatively, or in addition, the sustainability data 165 may include remediation data associated with the industrial system 105 (or a component thereof). In some configurations, the remediation data may be associated with past or historical remediation actions performed with respect to the industrial system 105 (or one or more industrial devices 152 thereof). The remediation data may include a previous remediation action taken with respect to the industrial system 105 (or a component thereof), one or more sustainability metrics associated with the previously performed remediation action, other data associated with the performed remediation action, or the like. As one non-limiting example, when the industrial system 105 includes a generator (e.g., as the industrial device 152) and the generator was previously remanufactured, the sustainability data 165 may indicate that the industrial device 152 is a generator (e.g., identification of the generator, where the identification may be specific to the generator, generic to a function or task performed by the generator, or the like), that the generator was remanufactured (e.g., as the previously-performed remediation action), and a set of sustainability metrics associated with the performance of the remanufacturing of the generator.

A remediation action may be an action taken with respect to the industrial system 105 (or one or more industrial devices 152 thereof). The remediation action may be an action taken in response to a failure event of one or more industrial device 152, a maintenance or servicing event of one or more of the industrial devices 152, or the like. For example, a remediation action may be an action taken when an industrial device 152 is not operating according to operation specifications, when an industrial device 152 is failing to operate, when an industrial device 152 is malfunctioning, etc. A remediation action may include, e.g., a remanufacture action (e.g., repairing or remanufacturing the industrial device 152), a replacement action (e.g., replacing the industrial device 152 with a remanufactured industrial device, a new, unused industrial device, etc.), a transportation action (e.g., transporting an industrial device), etc.

A sustainability metric may represent a measurement or degree of energy use, water use, material use, waste management or product reuse, pollution, and greenhouse gas emissions (e.g., carbon emissions), etc. For example, a sustainability metric may include an energy amount, a water amount, a waste amount, a carbon emissions amount, etc. The sustainability metric may be a measure of the degree of sustainability of a process (e.g., an industrial process performed by the industrial system 105), a product (e.g., the industrial device(s) 152), a service, (e.g., a remanufacturing service, a repair service, a remote support service, a field labor service, etc.), etc.

For example, in some configurations, a sustainability metric may be associated with a remediation action. Accordingly, in some configurations, a sustainability metric may represent an energy amount, a water amount, a waste amount, a carbon emissions amount, etc. associated with performance of a particular remediation action. As one non-limiting example, when the remediation action is replacing an industrial device 152, the sustainability metric may include an energy amount, a water amount, a waste amount, a carbon emissions amount, etc. associated with replacing the industrial device 152 (e.g., either with an identical, new industrial device 152 or an industrial device 152 capable of performing a similar function as the replaced industrial device 152).

In some instances, the sustainability metric may include measurements associated with Scope 3 emissions. As noted herein, Scope 3 emissions generally include indirect emissions (not included in Scope 2) that occur in the value chain of a reporting entity or company, including both upstream and downstream emissions (also referred to as a company's value chain or a corporate value chain). In some configurations, the sustainability metric may include measurements associated with product lifecycle emissions, such as, e.g., raw materials, manufacture, transport, storage, sale, use, and disposal. The sustainability metrics may include measurements associated with one or more emission classifications (e.g., Scope 1 emissions, Scope 2 emissions, Scope 3 emissions, Scope 4 emissions, etc.).

As noted above, in some configurations, the database 120 may also store one or more aggregated data sets, such as data sets from one or more facilities or other sources (e.g., as off-site data sets). In some configurations, the sustainability data 165 is an aggregated data set. Alternatively, or in addition, in some configurations, the database 120 is an aggregated data source. As one non-limiting example, in some configurations, the database 120 may store a set of monthly reporting that are compiled and aggregated.

FIG. 3 is a flowchart illustrating a method 300 of providing industrial automation sustainability reporting according to some configurations. The method 300 is described as being performed by the server 115 and, in particular, the application 220 as executed by the electronic processor 200. However, as noted herein, the functionality described with respect to the method 300 may be performed by other devices, such as the user device 110, a component included in the industrial system 105, or a combination thereof, distributed among a plurality of devices, such as a plurality of servers included in a cloud service, or a combination thereof.

As illustrated in FIG. 3, the method 300 may include receiving (or accessing), with the electronic processor 200, sustainability data associated with the industrial system 105 (at block 305). The electronic processor 200 may receive (or access) the sustainability data 165 from the database 120. Alternatively, or in addition, in some configurations, the electronic processor 200 may receive (or access) the sustainability data 165 from the industrial system 105 through the communication network 130. As one non-limiting example, in some configurations, the electronic processor 200 receives the sustainability data from the industrial system 105 in real-time (or near real-time). In some configurations, as noted above, the sustainability data 165 may be specific to an industrial device 152 included in the industrial system 105. Accordingly, in some configurations, the electronic processor 200 receives the sustainability data 165 associated with one or more industrial devices 152 included in the industrial system 105. Alternatively, or in addition, in some configurations, the electronic processor 200 receives the sustainability data 165 from multiple industrial devices, multiple industrial systems 105, multiple facilities, or a combination thereof.

In some configurations, the electronic processor 200 receives (or accesses) the sustainability data 165 in response to determining a fault condition (or error condition) associated with an industrial device 152. In such configurations, the electronic processor 200 may receive (or access) sustainability data 165 specific to the industrial device 152 associated with the fault condition (or error condition) (e.g., the industrial device 152 exhibiting a fault or abnormal operating status). Alternatively, or in addition, the electronic processor 200 may receive (or access) the sustainability data 165 based on a pre-determined schedule (e.g., on a monthly basis, a weekly basis, etc.).

As illustrated in FIG. 3, the electronic processor 200 may determine, based on the sustainability data, a predicted sustainability score for each of a plurality of remediation actions as a set of predicted sustainability scores (at block 310). A predicted sustainability score may be a predicted degree of sustainability. A predicted sustainability score may be specific to a remediation action. As one example, the predicted sustainability score for a first remediation action (e.g., a replacement action) may be different than a predicted sustainability score for a second remediation action (e.g., a remanufacture action). Accordingly, a predicted sustainability score may represent an estimated degree of sustainability associated with performing a potential remediation action. In some configurations, the electronic processor 200 may determine the predicted sustainability score using one or more of the equations described herein with respect to FIGS. 6-19.

In some configurations, the electronic processor 200 may determine a recommended remediation action based on the set of predicted sustainability scores. The recommended remediation action may be a remediation action associated with the lowest environmental impact (e.g., the most sustainable remediation action). In such configurations, the graphical representation may indicate the recommended remediation action (e.g., by adjusting a font size, a color, highlighting the recommended remediation action, animating the recommended remediation action, such as flashing, etc.).

In some configurations, the graphical representation may include a comparison of multiple remediation actions (e.g., a replacement action, a repair action, a remanufacture action, etc.). As one non-limiting example, the comparison may include comparing a first remediation action and a second remediation action. In some instances, the first remediation action includes replacing the industrial device with a new industrial device and the second remediation action includes repairing the industrial device. As another example, in some instances, the first remediation action includes replacing the industrial device with a new industrial device and the second remediation action includes remanufacturing the industrial device.

The electronic processor 200 may generate and transmit a graphical representation of the set of predicted sustainability scores for display (at block 315). In some configurations, the electronic processor 200 may transmit (via the communication network 130) the graphical representation to the display device 160 of the user device 110. In response to receiving the graphical representation, the user device 110 (e.g., an electronic processor of the user device 110) may output the graphical representation to the display device 160, and, ultimately, display (or otherwise provide) the graphical representation to a user of the user device 110. When the graphical representation is provided to the user, the user may interact with the graphical representation (e.g., via the HMI 155 of the user device 110). In some configurations, the graphical representation includes a graphical user interface (GUI). The graphical representation may include a graphical dashboard that represents a set of sustainability metrics associated with each remediation action.

In some configurations, the electronic processor 200 may determine a recommended remediation action based on the set of predicted sustainability scores. The recommended remediation action may be a remediation action associated with the lowest environmental impact (e.g., the most sustainable remediation action). In such configurations, the graphical representation may indicate the recommended remediation action (e.g., by adjusting a font size, a color, highlighting the recommended remediation action, animating the recommended remediation action, such as flashing, etc.).

In some configurations, the graphical representation may include a comparison of multiple remediation actions (e.g., a replacement action, a repair action, a remanufacture action, etc.). As one non-limiting example, the comparison may include comparing a first remediation action and a second remediation action. In some instances, the first remediation action includes replacing the industrial device with a new industrial device and the second remediation action includes repairing the industrial device. As another example, in some instances, the first remediation action includes replacing the industrial device with a new industrial device and the second remediation action includes remanufacturing the industrial device.

Figure 4A:
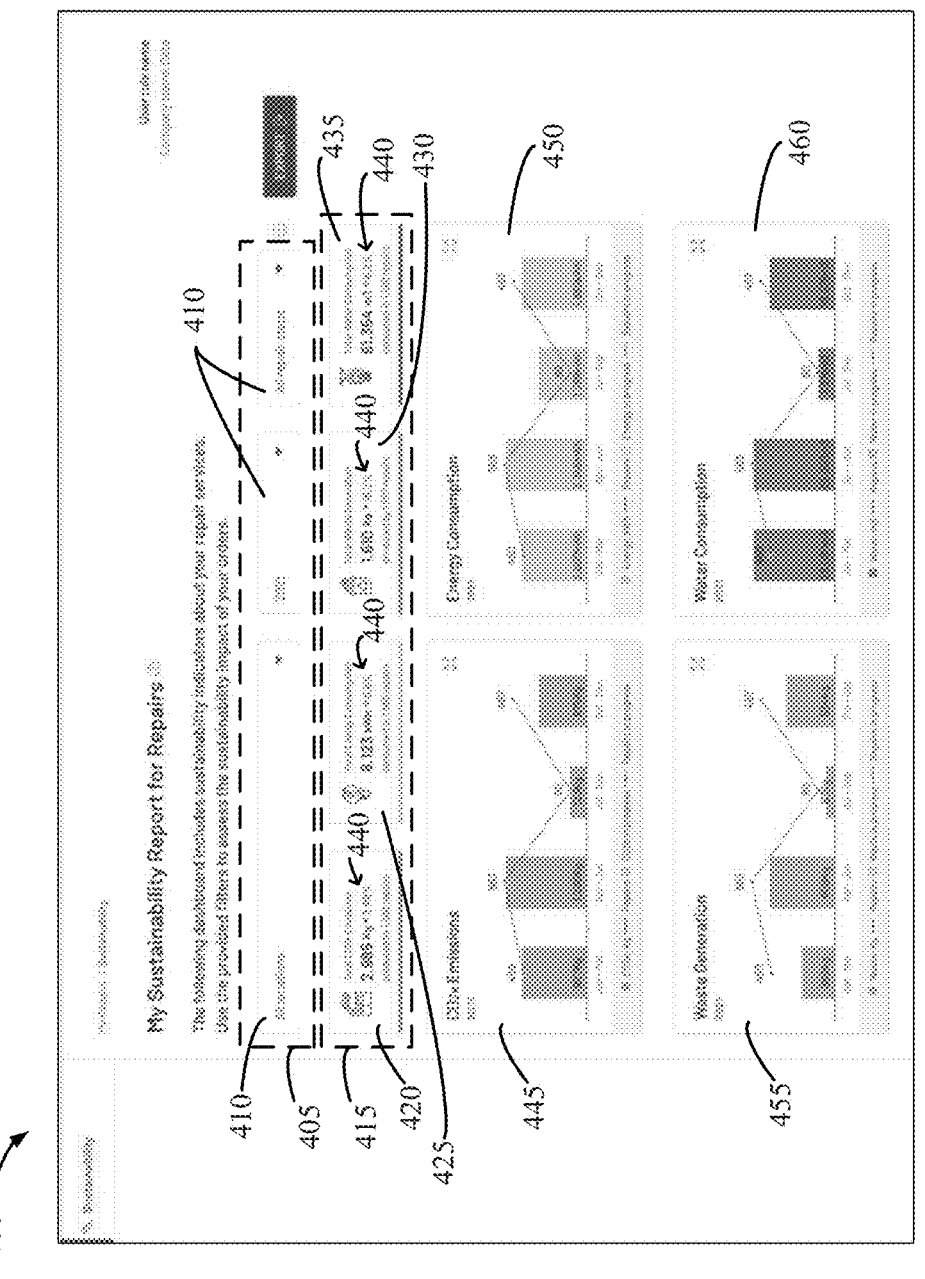
FIG. 4A illustrates an example repairs overview user interface of an industrial automation sustainability dashboard according to some configurations.
Figure 4B:
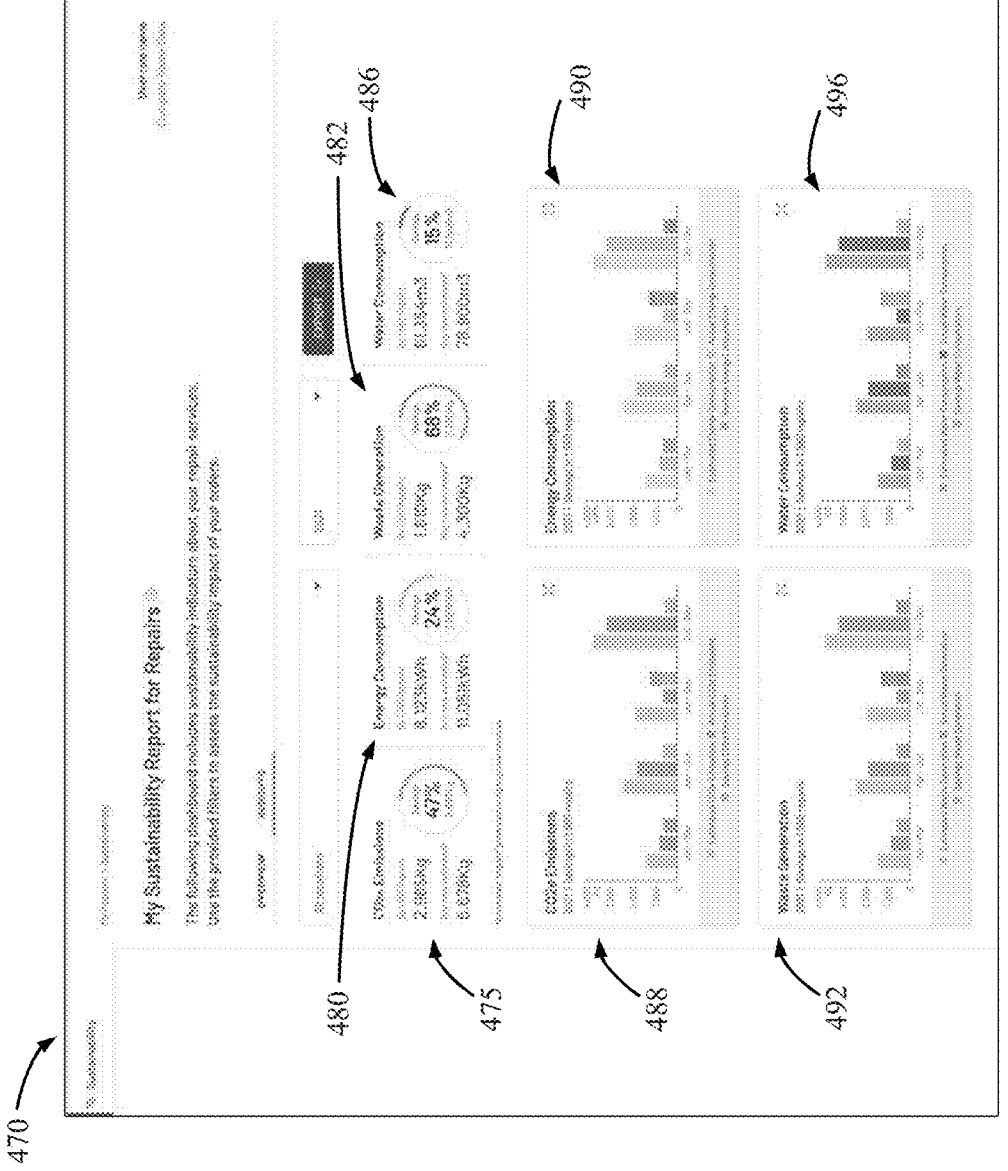
FIG. 4B illustrates an example sustainability insights user interface of an industrial automation sustainability dashboard according to some configurations.
Figure 5:
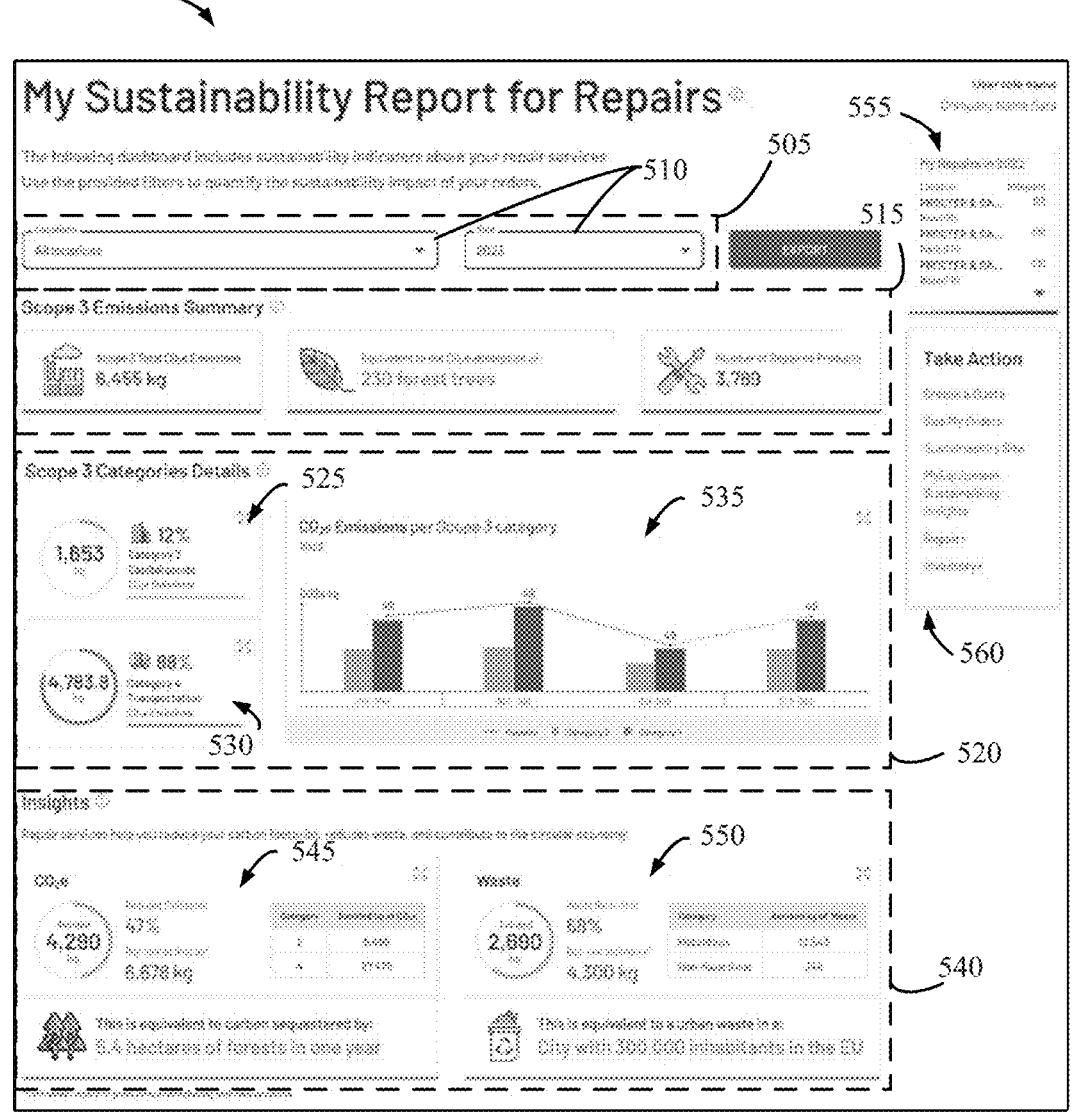
FIG. 5 illustrates an example scope 3 emissions user interface of an industrial automation sustainability dashboard according to some configurations.

FIGS. 4-5 illustrate screenshots of an example industrial automation sustainability dashboard according to some configurations. For example, FIG. 4A illustrates an repairs overview user interface (UI) 400 for repair orders according to some configurations. The repairs overview UI 400 includes a filtering portion 405. The filtering portion 405 may include one or more control components 410 (e.g., drop-down menus, checkboxes, text fields, etc.). In the example illustrated in FIG. 4A, the control components 410 include drop-down menus. A user may interact with the set of control components to set one or more filter conditions (e.g., a location condition, a date condition, a repair step, etc.). The repairs overview UI 400 may include sustainability data for repairs based on one or more filter conditions selected via the control components 410 of the filtering portion 405.

As illustrated in FIG. 4A, the repairs overview UI 400 may include a sustainability summary portion 415. The sustainability summary portion 415 may provide a summary with respect to one or more sustainability categories (e.g., a carbon emissions category, an energy consumption category, a waste generation category, and a water consumption category). For example, as illustrated in FIG. 4A, the sustainability summary portion 415 may include a total CO2e emissions indicator 420, a total energy consumption indicator 425, a total waste generation indicator 430, and a total water consumption indicator 435, where each indicator provides a sustainability tracking metrics (or totals) for a corresponding sustainability category.

In some configurations, the sustainability summary portion 415 may also include a trend indicator 440 for each sustainability category. The trend indicator 440 may indicate how a corresponding sustainability category is trending (e.g., trending downward or below an average, trending upward or above an average, etc.).

For example, as illustrated in the example of FIG. 4A, the total CO2e emissions indicator 420 indicates "2.985 Kg" as a total carbon emission produced by 1,560 repairs, which is a downward trend of 3.88% in carbon emissions. The total energy consumption indicator 425 indicates "8.123 kWh" as a total energy consumption consumed by 1,560 repairs, which is a downward trend of 0.6% in energy consumption. The total waste generation indicator 430 indicates "1.610 Kg" as a total waste generation produced by the 1,560 repairs, which is a downward trend of 18.2% in waste generation. The total water consumption indicator 435 indicates "61.354 m3" as a total water consumption consumed in 1,560 repairs, which is a downward trend of 6.2% in water consumption.

In some configurations, the repairs overview UI 400 may include a graph for each of the sustainability categories. Each graph may include sustainability data (or tracking data) for the corresponding sustainability category. For example, as illustrated in FIG. 4A, the repairs overview UI 400 includes a carbon emissions graph 445, an energy consumption graph 450, a waste generation graph 455, and a water consumption graph 460.

FIG. 4B illustrates an example sustainability insights UI 470 according to some configurations. The sustainability insights UI 470 may provide a comparison between one or more remediation actions (e.g., a replacement action, a repair action, a remanufacture action, etc.). For example, the sustainability insights UI 470 may include a comparison summary portion for each sustainability category. For example, in the example illustrated in FIG. 4B, the sustainability insights UI 470 may include a carbon emissions comparison summary portion 475, an energy consumption comparison summary portion 480, a waste generation comparison summary portion 482, and a water consumption comparison summary portion 486.

A comparison summary portion may indicate an estimated or predicted sustainability impact associated with one or more potential remediation actions for a sustainability category. For instance, a comparison summary portion may include an estimated (or predicted) sustainability metric associated with multiple remediation actions. Alternatively, or in addition, the comparison summary portion may indicate an estimated savings score, a difference sustainability score, or the like between two or more remediation actions. As one example, with reference to FIG. 4B, the carbon emissions comparison summary portion 475 may indicate that an estimated sustainability metric of using buy-new services (as a first remediation action) is 6.678 Kg while an estimated sustainability metric of by using repair services (as a second remediation action) is 2.985 Kg. Additionally, as illustrated in the example of FIG. 4B, the carbon emissions comparison summary portion 475 indicates that a difference between the two estimated sustainability metrics is 3.693 Kg (as a difference sustainability score), which represents an estimated savings of 47$ (as an estimated savings score).

The sustainability insights UI 470 may also include a set of remediation comparison graphs comparing multiple remediation actions. As illustrated in the example of FIG. 4B, the sustainability insights UI 470 includes a carbon emissions comparison graph 488, an energy consumption comparison graph 490, a waste generation comparison graph 492, and a water consumption comparison graph 496.

FIG. 5 illustrates an example scope 3 emissions UI 500 according to some configurations. The scope 3 emission UI 500 may include (or display) sustainability data for repairs. The scope 3 emissions UI 500 may include a filtering portion 505. The filtering portion 505 may include one or more control components 510 (e.g., drop-down menus, check boxes, text fields, etc.). In the example illustrated in FIG. 5, the control component(s) 510 include drop-down menus. A user may interact with the control component(s) 510 to set one or more filter conditions (e.g., a location condition, a date condition, etc.) for filtering the sustainability data displayed via the scope 3 emissions UI 500. Accordingly, in some configurations, the scope 3 emission UI 500 may include sustainability data for repairs based on one or more filter conditions selected via the control components 510 of the filtering portion 505.

The scope 3 emissions UI 500 of FIG. 5 may also include a scope 3 emissions summary section 515. The scope 3 emissions summary section 515 may include data or information pertaining to carbon dioxide emissions, carbon dioxide absorption, a count of repaired products of a user, etc. As illustrated in FIG. 5, the scope 3 emissions UI 500 may include a details section 520 of scope 3 categories. For example, the details section 520 may include a category 2 capital goods emissions percentage (represented in FIG. 5 by reference numeral 525), a category 4 transportation emissions percentage (represented in FIG. 5 by reference numeral 530), a corresponding category emissions graph (represented in FIG. 5 by reference numeral 535), etc. As also illustrated in FIG. 5, the scope 3 emissions UI 500 may include an insights section 540. For example, the insights section 540 may include details pertaining to carbon dioxide (represented in FIG. 5 by reference numeral 545) and waste emissions (represented in FIG. 5 by reference numeral 550).

As illustrated in FIG. 5, the scope 3 emissions UI 500 may include a repair summary portion 555 and a navigation portion 560. The repair summary portion 555 may include options for the user to view the location and reports associated with their repairs. The navigation portion 560 may include a list of interactive links (e.g., hyperlinks). When a user interact with an interactive link of the navigation portion 560, the user may be provided (or navigated to) additional information.

Figure 6:
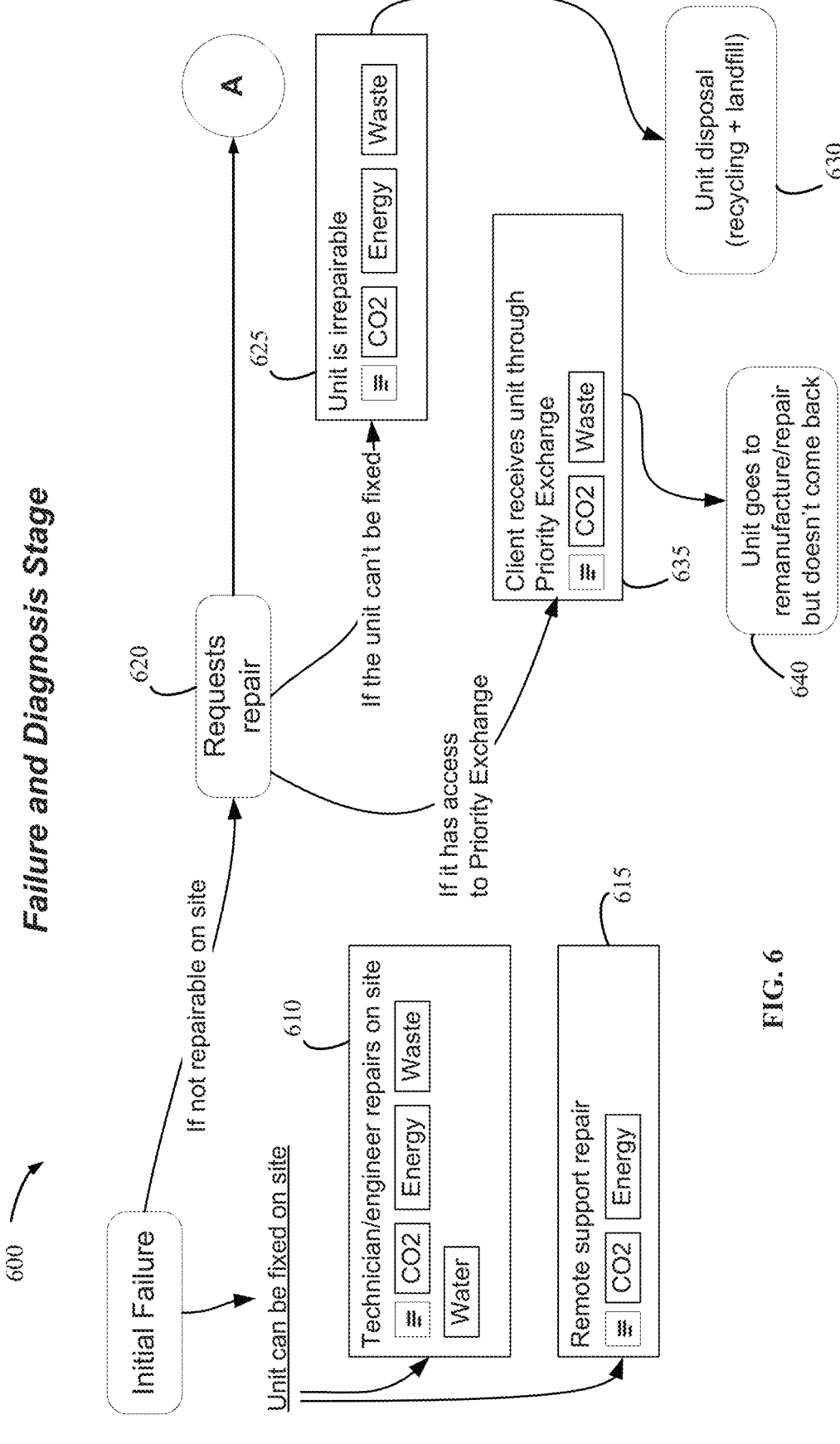
FIG. 6 illustrates a failure and diagnosis stage of an industrial device life cycle journey according to some configurations.

FIG. 6 illustrates a failure and diagnosis stage 600 of an industrial device lifecycle journey according to some configurations. The failure and diagnosis stage 600 may be associated with a specific sequence of industrial automation sustainability calculations. When an industrial device 152 may be fixed on site, a technician/engineer may repair the industrial device 152 on site (represented in FIG. 6 by reference numeral 610). Calculations associated with a technician/engineer repairing the industrial device 152 on site are represented in FIG. 7, where GHGi represents an emitted greenhouse gas (GHG) emissions due to repair of one or more products (kg $CO_2e$/unit product), Pi represents a power consumption due to repair (e.g., electricity, tools, heating, etc.) (kW), t represents repair time (h), EFg represents a GHG emission factor (grid-specific) (kg $CO_2e$/kWh), AFi represents a number of products repaired (number), ei represents specific energy consumption due to repair of product i (kWh/unit product), wi represents water consumption per product repaired (m3/Unit product), q represents flow of water consumed during reparation (m3/h), Rwi represents waste generation per product repaired (kg waste/Unit product), P represents total number of waste parts generated during repair (Number/day or/year), wp represents part weight (kg/part), AF represents total number of products repaired (number/day), GHGt represents total transportation GHG emissions (kg $CO_2e$), ΣDi represents total distance covered by transports (km), EFf represents GHG emission factor (fuel-specific) (kg $CO_2e$/km), Rwi represents weight of industrial system provider wastes on transport vehicles (kg waste/unit product), WFi represents total weight of cargo (kg), AFi represents number of industrial system provider waste units on the vehicle (number).

Figure 8:
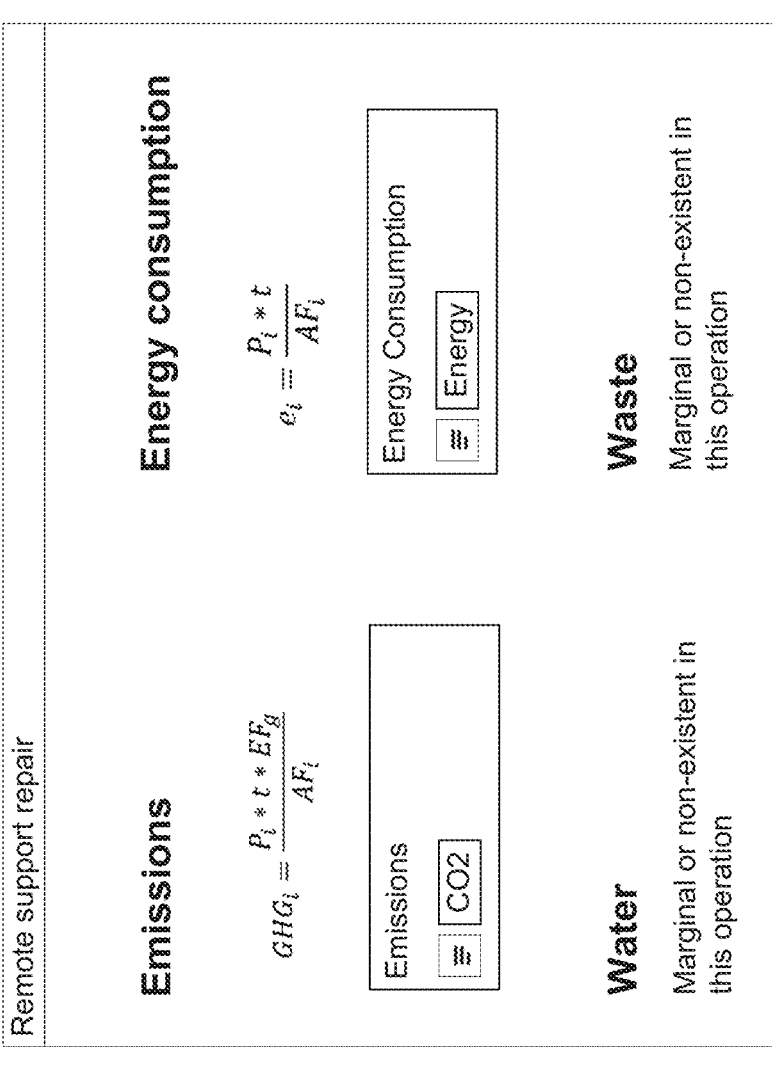
FIG. 8 illustrates calculations associated with a remote support repair according to some configurations.

Alternatively, a remote support repair may occur (represented in FIG. 6 by reference numeral 615). Calculations associated with a remote support repair are represented in FIG. 8, where GHGi represents an emitted greenhouse gas (GHG) emissions due to repair of one or more products (kg $CO_2e$/unit product), Pi represents a power consumption due to repair (e.g., electricity, tools, heating, etc.) (kW), t represents repair time (h), EFg represents a GHG emission factor (grid-specific) (kg $CO_2e$/kWh), AFi represents a number of products repaired (number), and ei represents specific energy consumption due to repair of product i (kWh/unit product).

When the industrial device 152 is not repairable on site, a repair request may be initiated (represented in FIG. 6 by reference numeral 620). When the industrial device 152 cannot be repaired (or fixed), the industrial device 152 may be determined to be irreparable (represented in FIG. 6 by reference numeral 625), and, ultimately, the industrial device 152 may be disposed of (represented in FIG. 6 by reference numeral 630). Calculations associated with a situation when the industrial device 152 is not repairable on site and the unit is irreparable are represented in FIG. 9, where Rwi represents waste generation per irreparable unit (kg waste/Unit product), nr represents % of non-recyclable parts (%), wu represents unit weight (kg/unit product), GHGi represents transportation greenhouse gases emissions (kg $CO_2e$/Unit product), GHGt represents total transportation non-RA GHG emissions (kg $CO_2e$), ΣDi represents total distance covered by transports (km), EFf represents GHG emission factor (fuel-specific) (kg $CO_2e$/km), Rwi represents weight of RA wastes on the vehicles (kg waste/unit product), WFi represents total weight of cargo (kg), AFi represents number of RA waste units on the vehicle (No), Rwi represents waste generation per irreparable unit (kg/Unit product), Rri represents recyclable parts (kg/unit product), EFl represents GHG emission factor (landfill) (kg $CO_2e$/kg), and EFr=GHG emission factor (recycling) (kg $CO_2e$/kg).

In some instances, a customer may have access to a device exchange program or process. In such instances, the customer may receive an exchange device through the device exchange program (represented in FIG. 6 by reference numeral 635), and, in some instances, the failed industrial device provided for remanufacture/repair without returning to the customer facility (represented in FIG. 6 by reference numeral 640). Calculations associated with a situation when the industrial device 152 is not repairable on site and there customer has access to an exchange program or process are represented in FIG. 10, where GHGi represents transportation greenhouse gases emissions (kg $CO_2e$/Unit product), GHGt represents total transportation GHG emissions (kg $CO_2e$), ΣDi represents total distance covered by transports (km), Ni represents weight of industrial system provider product on vehicles (kg/unit product), Pw represents weight of packaging (kg packaging/Unit product), p % represents percentage of unit weight, wu represents weight of unit (kg/unit product), EFf represents GHG emission factor (fuel-specific) (kg $CO_2e$/km), WFi represents total weight of cargo (kg), AFi represents number of industrial system provider waste units on the vehicle (No), Pwi represents packaging waste (kg/Unit product), Rri represents recyclable parts (kg/unit product), EFl represents GHG emission factor (landfill) (kg $CO_2e$/kg), and EFr represents GHG emission factor (recycling) (kg $CO_2e$/kg).

Figure 11:
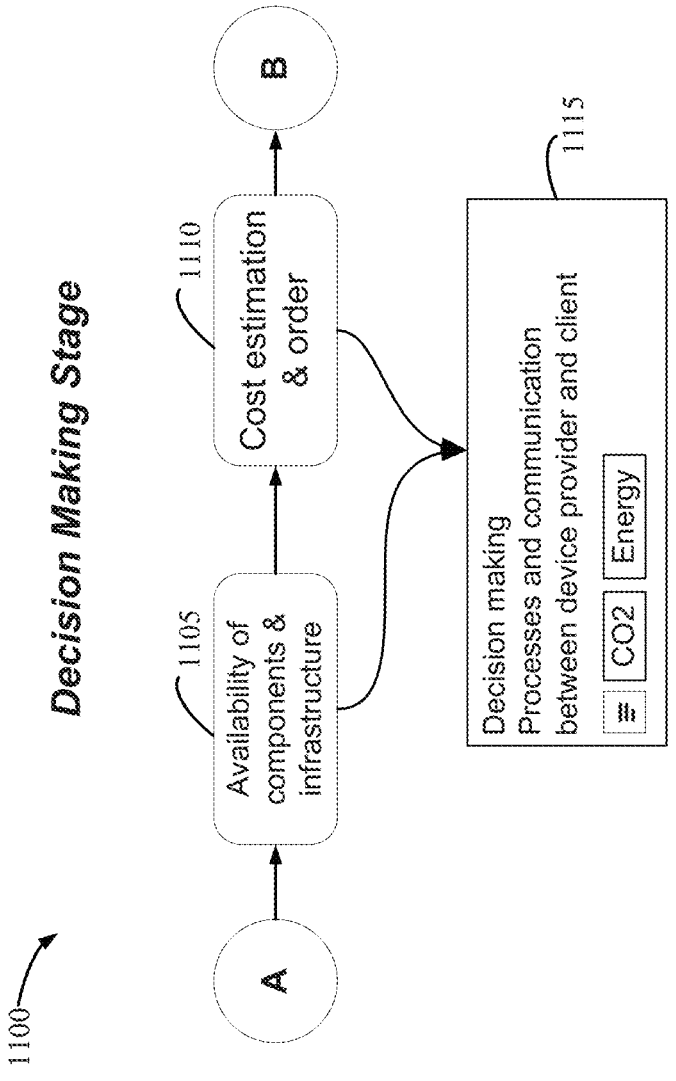
FIG. 11 illustrates a decision-making stage of an industrial device life cycle journey according to some configurations.
Figure 12:
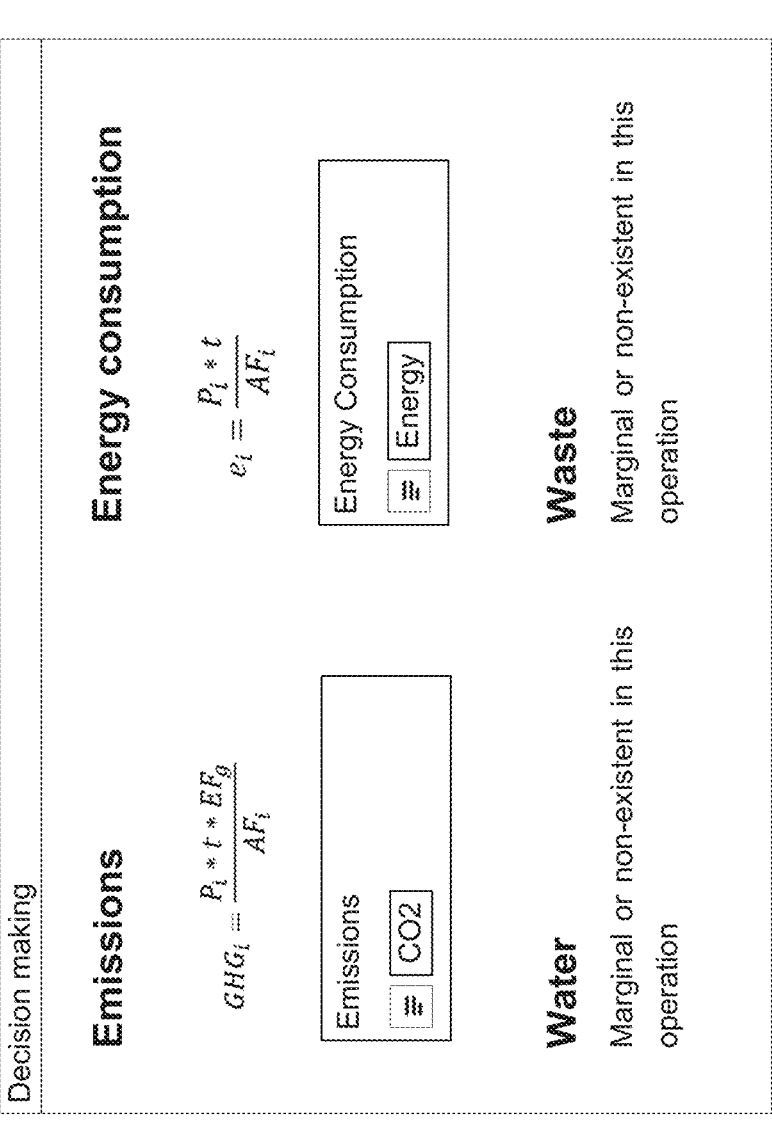
FIG. 12 illustrates calculations associated with the decision-making stage according to some configurations.

FIG. 11 illustrates a decision-making stage 1100 of an industrial device lifecycle journey according to some configurations. As illustrated in FIG. 11, the decision-making stage 1100 may include an availability of components and infrastructure portion (represented in FIG. 11 as reference numeral 1105) and a cost estimation and order portion (represented in FIG. 11 as reference numeral 1110). Additionally, the decision-making stage 1100 may include a decision-making process and communication between device provider and client (or customer) (represented in FIG. 11 by reference numeral 1115). Calculations associated with the decision-making stage 1110 are represented in FIG. 12, where GHGi represents emitted GHG due to repair of one product (kg $CO_2e$/unit product), Pi represents power consumption of electronic devices (kW), t represents decision making duration (h), EFg represents GHG emission factor (grid-specific) (kg $CO_2e$/kWh), AFi represents number of products involved (No), and ei represents specific energy consumption due to repair of product i (kWh/unit product).

Figure 13:
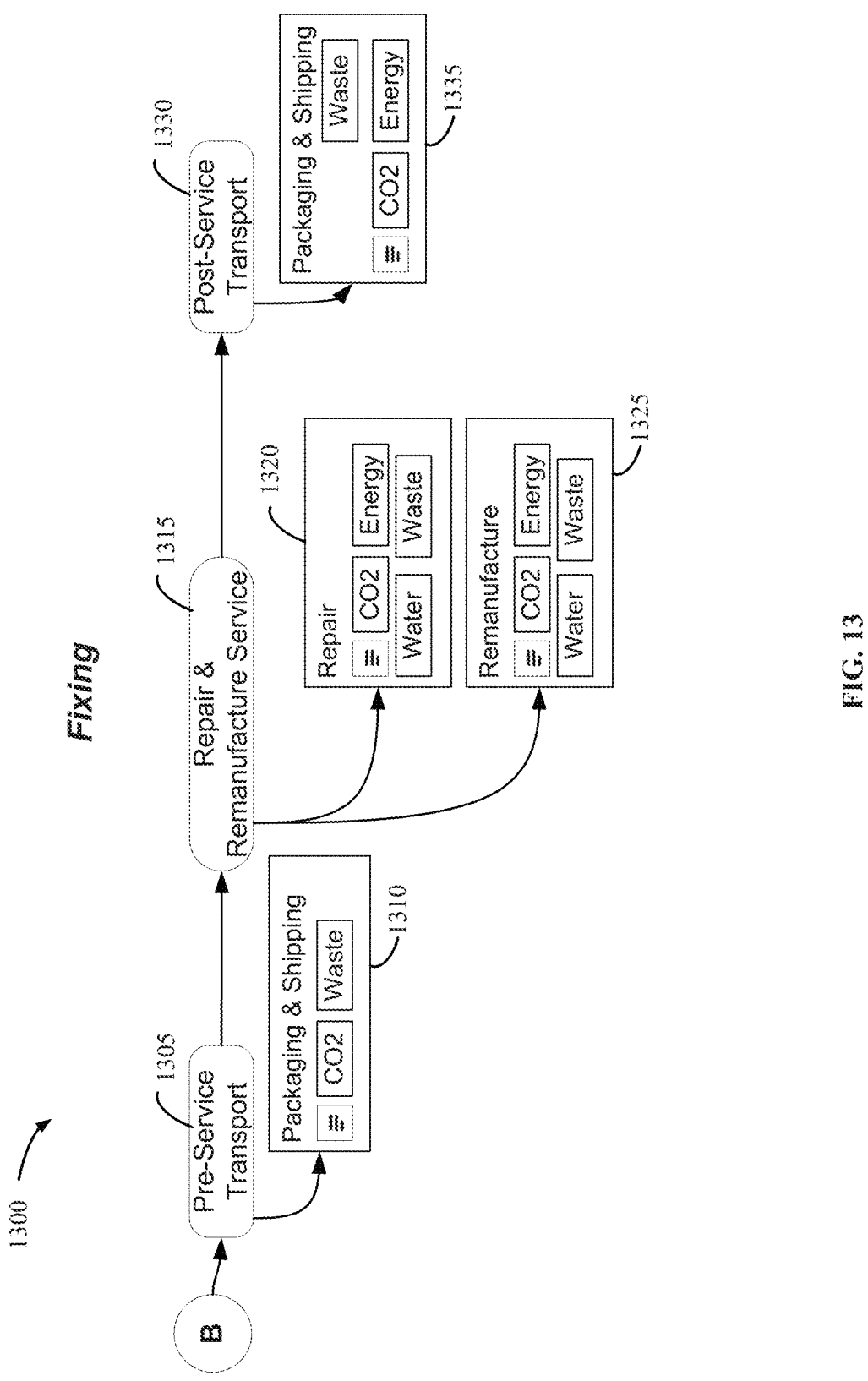
FIG. 13 illustrates a fixing stage of an industrial device life cycle journey according to some configurations.

FIG. 13 illustrates a fixing stage 1300 of an industrial device lifecycle journey according to some configurations. As illustrated in FIG. 13, the fixing stage 1300 may include a pre-service transport of the industrial device 152 (represented in FIG. 13 by reference numeral 1305), which may include packaging and shipping of an industrial machine 152, such as the failed industrial machine 152 (represented in FIG. 13 by reference numeral 1310). The fixing stage 1300 may include a repair and remanufacture service component 1315, which may include repair of the industrial device 152 (represented in FIG. 13 by reference numeral 1320) and remanufacture of the industrial device 152 (represented in FIG. 13 by reference numeral 1325). The fixing stage 1300 may include another transport portion 1330, which may include packaging and shipping of the repaired/ remanufactured industrial device 152 (represented in FIG. 13 by reference numeral 1335).

Calculations associated with pre-service packaging and shipping are represented in FIG. 14 where GHGi represents transportation greenhouse gases emissions (kg CO2e/Unit product), GHGt represents total transportation GHG emissions (kg CO2e), ΣDi represents total distance covered by transports (km), EFf represents GHG emission factor (fuel-specific) (kg CO2e/km), Ni represents weight of industrial system provider product on the vehicles (kg/unit product), WFi represents total weight of cargo (kg), AFi represents number of RA units on the vehicle (No), Pw represents weight of packaging (kg packaging/Unit product), p % represents percentage of unit weight, wu represents weight of unit (kg/unit product), Pwi represents packaging waste (kg/Unit product), Rri represents recyclable parts (kg/unit product), EFl represents GHG emission factor (landfill) (kg CO2e/kg), and EFr GHG emission factor (recycling) (kg CO2e/kg).

Calculations associated with repair are represented in FIG. 15, where GHGi represents transportation greenhouse gases emissions (kg CO2e/Unit product), GHGt represents total transportation GHG emissions (kg CO2e), ΣDi represents total distance covered by transports (km), EFf represents GHG emission factor (fuel-specific) (kg CO2e/km), Ni represents weight of industrial system provider product on the vehicles (kg/unit product), WFi represents total weight of cargo (kg), AFi represents number of industrial system provider units on the vehicle (No), Pw represents weight of packaging (kg packaging/Unit product), p % represents percentage of unit weight, wu represents weight of unit (kg/unit product), Pwi represents packaging waste (kg/Unit product), Rri represents recyclable parts (kg/unit product), EFl represents GHG emission factor (landfill) (kg CO2e/kg), EFr represents GHG emission factor (recycling) (kg CO2e/kg), and Pwi represents weight of packaging wastes on the vehicles (kg waste/unit product).

Calculations associated with repair testing are represented in FIG. 16, where GHGi represents emitted GHG due to reman of one product (kg CO2e/unit product), Pi represents power consumption due to reman (kW), t represents remanufacture time (h), EFg represents GHG emission factor (grid-specific) (kg CO2e/kWh), AFi represents number of products remanufactured (N°), and ei represents specific energy consumption due to reman of one product (kWh/unit product).

Calculations associated with remanufacture are represented in FIG. 17, where GHGi represents emitted GHG due to reman of one product (kg CO2e/unit product), Pi represents power consumption due to reman (kW), t represents remanufacture time (h), EFg represents GHG emission factor (grid-specific) (kg CO2e/kWh), AFi represents number of products remanufactured (N°), ei represents specific energy consumption due to reman of one product (kWh/unit product), Pi represents power consumption of reman (kW), t represents reman time (h), wi represents water consumption per product remanufactured (m3/Unit product), q represents flow of water consumed during reman (m3/h), AF represents number of products remanufactured (N°), Rwi represents waste generation per product remanufactured (kg waste/Unit product), P represents total number of waste parts generated during reman (Number/day or/year), wp represents part weight (kg/part), AF represents total number of products remanufactured (N°/day), GHGt represents total transportation non-RA GHG emissions (kg CO2e), ΣDi represents total distance covered by transports (km), EFf represents GHG emission factor (fuel-specific) (kg CO2e/km), WFi represents total weight of cargo (kg), Rri represents recyclable parts (kg/unit product), EFl represents GHG emission factor (landfill) (kg CO2e/kg), and EFr represents GHG emission factor (recycling) (kg CO2e/kg).

Calculations associated with after-remanufacture tests are represented in FIG. 18, where GHGi represents emitted GHG due to reman of one product (kg CO2e/unit product), Pi represents power consumption of electronics device (kW), t represents tests duration (h), EFg represents GHG emission factor (grid-specific) (kg CO2e/kWh), AFi represents number of products remanufactured (N°), ei represents specific energy consumption due to remanufacture of one product (kWh/unit product), and t represents remanufacture time (h).

Calculations associated with post-service packaging and shipping are represented in FIG. 19, where GHGi represents transportation greenhouse gases emissions (kg CO2e/Unit product), GHGt represents total transportation non-RA GHG emissions (kg CO2e), ΣDi represents total distance covered by transports (km), EFf represents GHG emission factor (fuel-specific) (kg CO2e/km), Ni represents weight of industrial system provider product on the vehicles (kg/unit product), WFi represents total weight of cargo (kg), AFi represents number of industrial system provider units on the vehicle (No), Pw represents weight of packaging (kg packaging/Unit product), p % represents percentage of unit weight, wu represents weight of unit (kg/unit product), Pwi represents packaging waste (kg/Unit product), Rri represents recyclable parts (kg/unit product), EFl represents GHG emission factor (landfill) (kg CO2e/kg), EFr represents GHG emission factor (recycling) (kg CO2e/kg), GHGt represents total transportation non-RA GHG emissions (kg CO2e), and Pwi represents weight of packaging wastes on the vehicles (kg waste/unit product).

Figure 20:
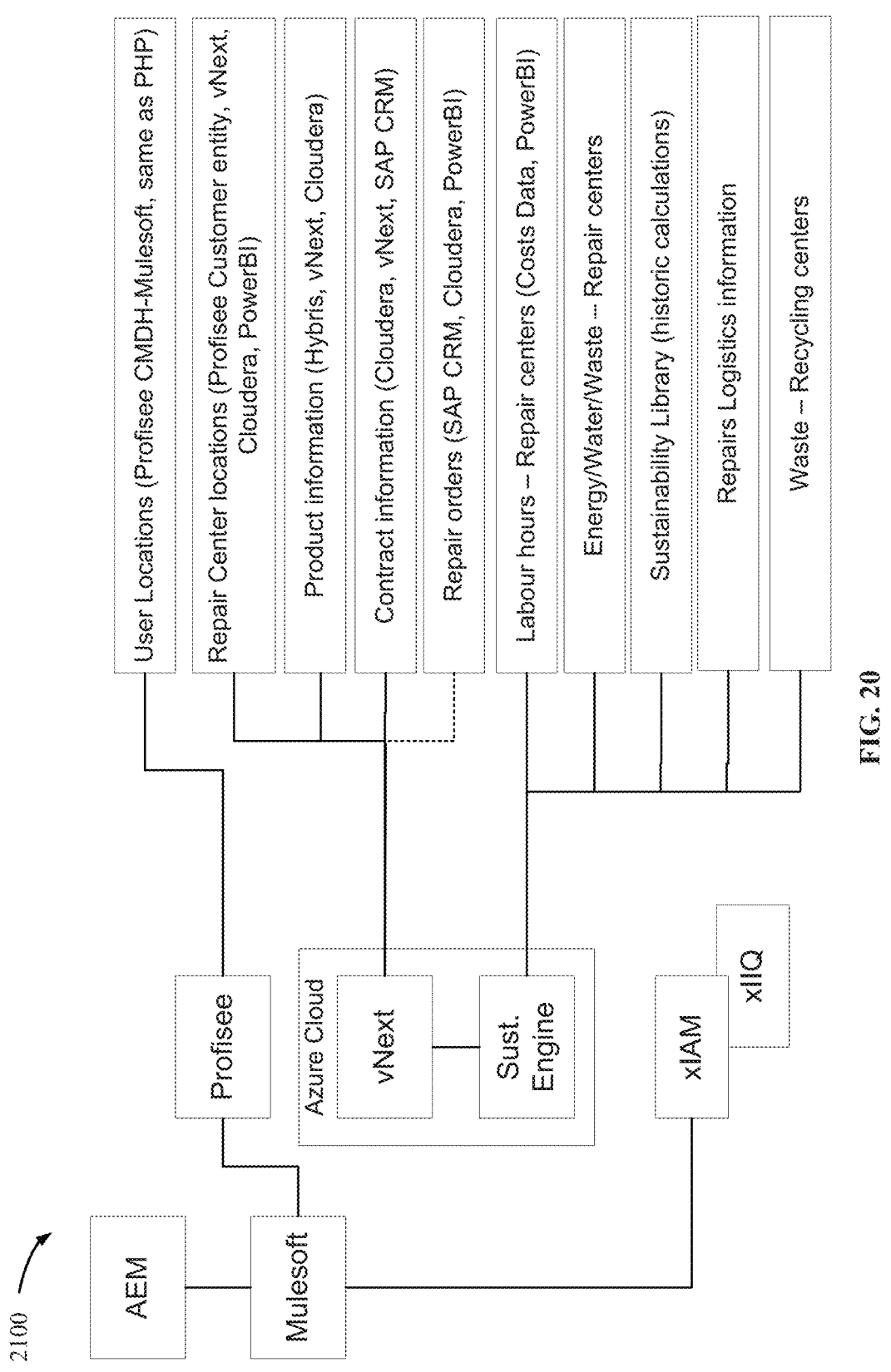
FIG. 20 schematically illustrates a data flow diagram structure associated with a sustainability calculator according to some configurations.

FIG. 20 schematically illustrates a data flow diagram structure 2000 associated with a sustainability calculator according to some configurations. In some configurations, the electronic processor 200 may execute the data flow illustrated in FIG. 20 as part of performing the methods and systems disclosed herein (e.g., the method 300 of FIG. 3).

Figure 21:
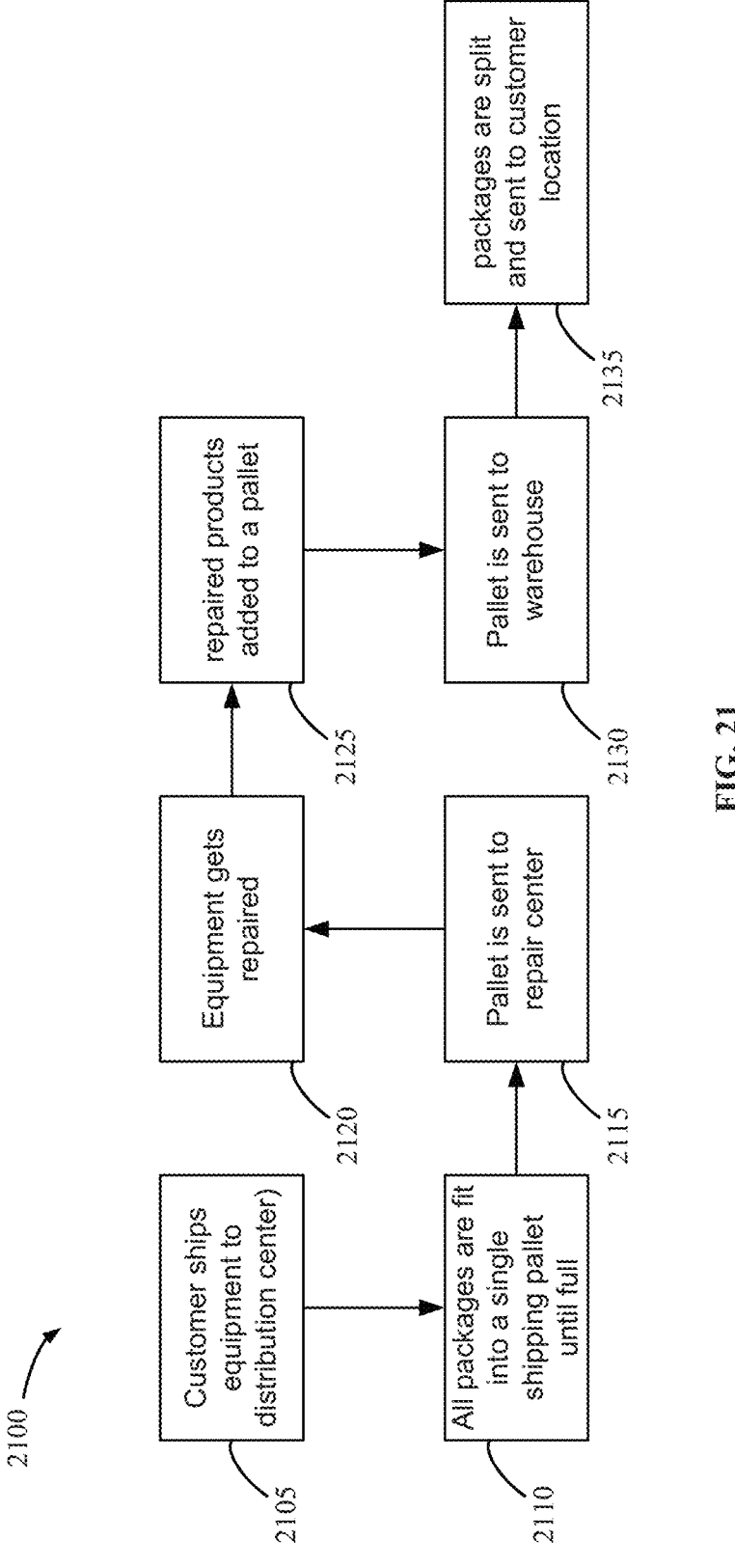
FIG. 21 schematically illustrates a shipping process according to some configurations.

FIG. 21 schematically illustrates an example shipping process 2100 according to some configurations. As illustrated in FIG. 21, the shipping process 2100 may include a customer shipping equipment to a distribution center (at block 2105). The shipping process 2100 may also include fitting packages into a shipping pallet until a single pallet is full (at block 2110). The shipping process 2100 may include the pallet being sent to a repair center (at block 2115). The shipping process 2100 may include the equipment getting repaired (at block 2120). The shipping process 2100 may include adding the repaired products to a pallet (at block 2125). The shipping process 2100 may include sending the pallet to a warehouse (at block 2130). The shipping process 2100 may include splitting and sending the packages to an appropriate customer location (at block 2135).

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for providing industrial automation sustainability reporting, the system comprising:

an electronic processor configured to:
in response to determining a fault condition associated with an industrial device included in an industrial system, access sustainability data for the industrial device;
determine, based on the sustainability data, a predicted sustainability score for each of a plurality of remediation actions as a set of predicted sustainability scores;
generate and transmit a graphical representation of the set of predicted sustainability scores for display;
determine a recommended remediation action based on the set of predicted sustainability scores; and
control the graphical representation to visually indicate the recommended remediation action.

2. The system of claim 1, wherein the graphical representation includes a graphical user interface.

3. The system of claim 1, wherein the graphical representation includes a graphical dashboard that represents a set of sustainability metrics associated with each of the plurality of remediation actions.

4. The system of claim 1, wherein the sustainability data is aggregated data associated with a plurality of data sources.

5. The system of claim 1, wherein the sustainability data includes remediation data related to historical remediation actions performed with respect to the industrial system.

6. The system of claim 3, wherein the set of sustainability metrics relate to indirect emissions.

7. The system of claim 1, wherein the recommended remediation action is associated with a lowest environmental impact relative to other remediation actions included in the plurality of remediation actions.

8. The system of claim 1, wherein the graphical representation includes a comparison of a first remediation action and a second remediation action.

9. The system of claim 8, wherein the first remediation action includes replacing the industrial device with a new industrial device and the second remediation action includes repairing the industrial device.

10. The system of claim 8, wherein the first remediation action includes replacing the industrial device with a new industrial device and the second remediation action includes remanufacturing the industrial device.

11. A method for providing industrial automation sustainability reporting, the method comprising:

in response to determining a fault condition associated with an industrial device included in an industrial system, accessing, with an electronic processor, sustainability data for the industrial device;
determining, with the electronic processor, based on the sustainability data, a predicted sustainability score for each of a plurality of remediation actions as a set of predicted sustainability scores;
generating and transmitting, with the electronic processor, a graphical representation of the set of predicted sustainability scores for display;
determining, with the electronic processor, a recommended remediation action based on the set of predicted sustainability scores; and
controlling, with the electronic processor, the graphical representation to visually indicate the recommended remediation action.

12. The method of claim 11, wherein generating and transmitting the graphical representation includes generating and transmitting a graphical user interface.

13. The method of claim 11, wherein generating and transmitting the graphical representation includes generating and transmitting a graphical dashboard that represents a set of sustainability metrics associated with each of the plurality of remediation actions.

14. The method of claim 11, wherein the graphical representation includes a comparison of a first remediation action and a second remediation action.

15. The method of claim 14, wherein the first remediation action includes replacing the industrial device with a new industrial device and the second remediation action includes repairing the industrial device.

16. The method of claim 14, wherein the first remediation action includes replacing the industrial device with a new industrial device and the second remediation action includes remanufacturing the industrial device.

17. A non-transitory computer-readable medium storing instructions that, when executed by an electronic processor, perform a set of functions, the set of functions comprising:

in response to determining a fault condition associated with an industrial device included in an industrial system, accessing sustainability data for the industrial device;
determining based on the sustainability data, a predicted sustainability score for each of a plurality of remediation actions as a set of predicted sustainability scores;
generating and transmitting a graphical representation of the set of predicted sustainability scores for display;
determining a recommended remediation action based on the set of predicted sustainability scores; and
controlling the graphical representation to visually indicate the recommended remediation action.

18. The computer-readable medium of claim 17, wherein generating and transmitting the graphical representation includes generating and transmitting a graphical dashboard that represents a set of sustainability metrics associated with each of the plurality of remediation actions.

19. The computer-readable medium of claim 17, wherein the plurality of remediation actions includes replacing the industrial device with a new industrial device as a first recommendation action and repairing the industrial device as a second recommendation action.

* * * * *